United States Patent [19]

Gretczko

[11] 4,304,967

[45] Dec. 8, 1981

[54] REMOTE CONTROL APPARATUS

[76] Inventor: Irwin Gretczko, 255 W. 90th St., New York, N.Y. 10024

[21] Appl. No.: 45,343

[22] Filed: Jun. 4, 1979

[51] Int. Cl.³ ............................................. H04M 1/26
[52] U.S. Cl. ................................. 179/2 A; 179/84 R
[58] Field of Search ................. 179/2 A, 84 R, 84 L, 179/84 T, 6 R, 6 E; 340/168 R, 164 R, 167 R

[56] References Cited

U.S. PATENT DOCUMENTS

| | | | |
|---|---|---|---|
| 3,702,904 | 11/1972 | Bard | 179/84 R |
| 3,783,193 | 1/1974 | Lee | 179/2 A |
| 3,876,836 | 4/1975 | Langan | 179/84 R |

*Primary Examiner*—Joseph A. Popek

*Attorney, Agent, or Firm*—Stephen E. Feldman; Marvin Feldman

[57] ABSTRACT

An apparatus for remote control applications comprises a detection device which is responsive to input signals for generating countable signals. A counting device is responsive to the countable signals for generating a time signal for each countable signal and a switching signal after a set number of countable signals. A first timer is responsive to the time signal for preventing the counting device from responding to the countable signals for a first period of time. A second timer is activated by said first timer at the end of the first period of time for resetting the counting device if a countable signal is not generated during a second period of time.

9 Claims, 3 Drawing Figures

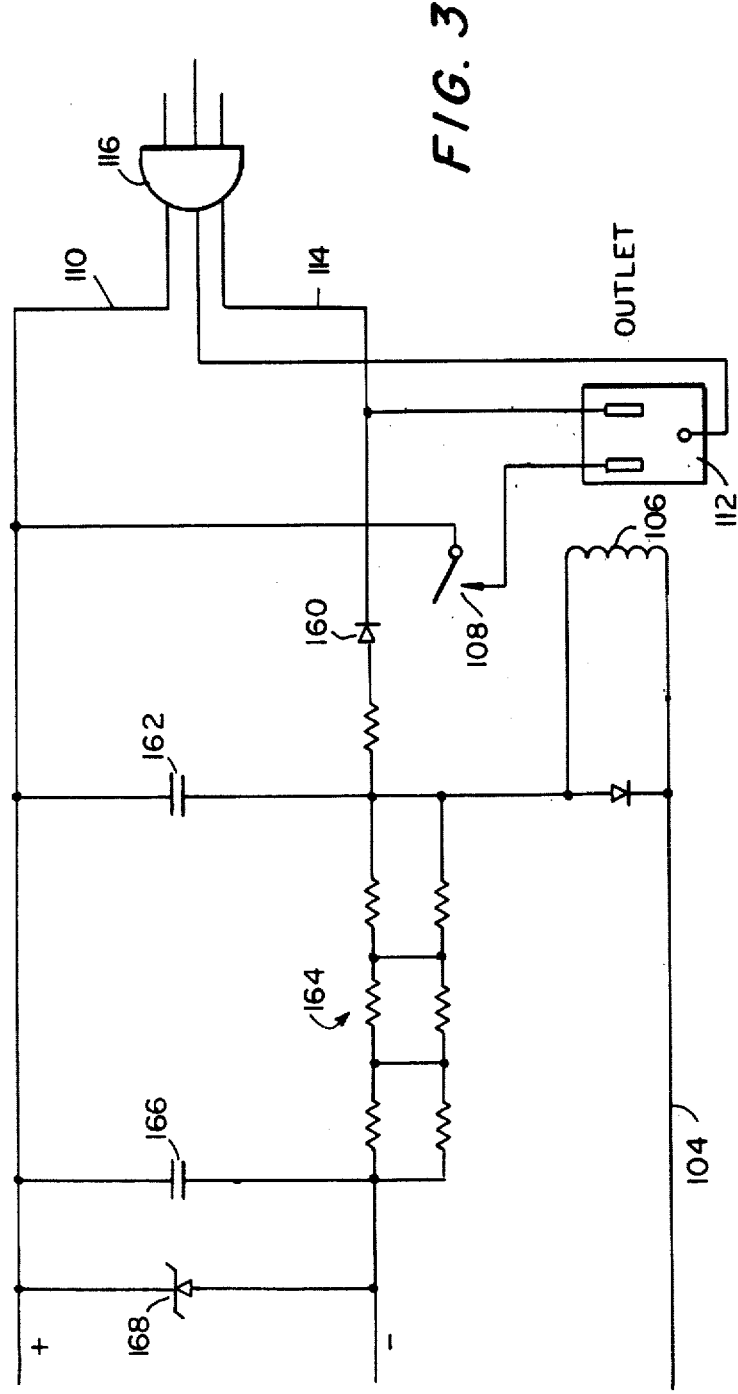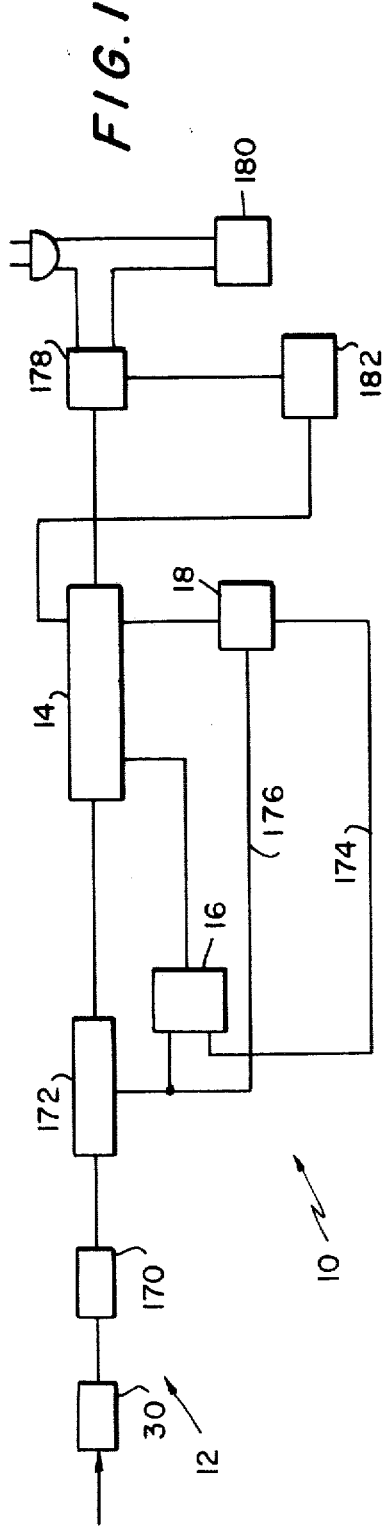

ated during a second period of time.

For a better understanding of the present invention, together with other and further objects thereof, reference is had to the following description, taken in connection with the accompanying drawings, while its scope will be pointed out in the appended claims.

BRIEF DESCRIPTION OF THE DRAWINGS

FIG. 1 is a block diagram of the apparatus for remote control applications in accordance with the preferred form of the present invention.

FIG. 3 is a schematic diagram of the power supply of the present invention.

DESCRIPTION OF THE PREFERRED EMBODIMENT

REMOTE CONTROL APPARATUS

BACKGROUND OF THE INVENTION

Figure 2:
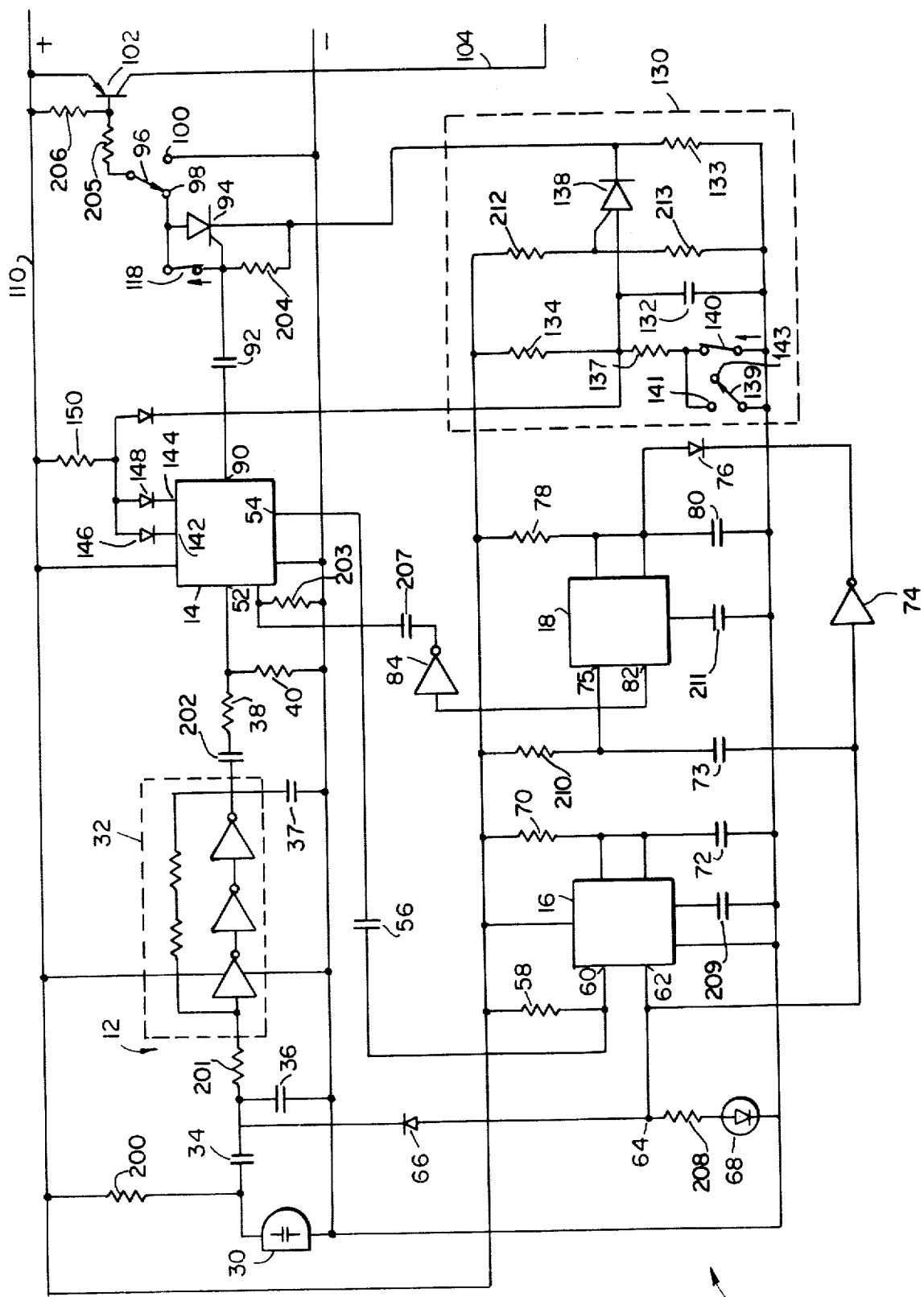
FIG. 2 is a schematic diagram of the electrical circuitry of the present invention for remote control applications.

While the invention is subject to a wide range of applications, it is especially suited for use in a remote control system and will be particularly described in that connection.

Very often, it is necessary and desirable to remotely control various electrical devices. For instance, a user may wish to turn on various devices such as for example, a heater in a swimming pool, or the heating or air conditioning system of a house while being far away from that location. This capability is particularly important where the devices or equipment require a long time after they are turned on to reach the desired operating condition. For example, an air conditioning unit may require several hours in order to bring a house to a desired temperature. Thus, it becomes necessary to either run it for extended periods of time, or else waiting the time before it reaches the desirable condition after the user manually turns it on.

In the past, wireless remote control systems have been known in the art. For example, U.S. Pat. No. 3,360,777 to Kolm discloses for example, "a sonic system in which a timed sequence of sounds or sound-like signals actuate a switch to turn on or off the controlled device. For control from a distant location, the telephone system serves to transmit the signals used by the sonically actuated switching network."

U.S. Pat. No. 3,783,193 to Lee, discloses for example, "the apparatus of the present invention is located in the vicinity of a called telephone subscriber station and is operated to activate a remotely located device through a plurality of series of ringing signals initiated by a calling telephone subscriber station and produced by the called telephone subscriber station."

Many of the prior art devices had the problem of being complicated to actuate, relatively easy to actuate erroneously, and often expensive to produce.

It is an object of the present invention to provide an apparatus for remote control applications which obviates some or all of the above-mentioned problems.

It is a further object of the present invention to provide an apparatus for remote control applications which is relatively easy to operate.

It is a further object of the present invention to provide an apparatus for remote control applications which is not easily actuated by an erroneous signal.

It is a yet further object of the present invention to provide an apparatus for remote control applications which is relatively inexpensive to manufacture.

SUMMARY OF THE INVENTION

Accordingly, there has been provided an apparatus for remote control applications which comprises a detection device which is responsive to input signals for generating countable signals. A counting device is responsive to the countable signals for generating a time signal for each countable signal and a switching signal after a set number of countable signals. A first timer is responsive to the time signal for presenting the counting device for responding to the countable signals for a first period of time. A second timer is activated by said first timer at the end of the first period of time for resetting the counting device if a countable signal is not generated during a second period of time.

An apparatus 10 for remote control applications comprises a detection device 12 which is responsive to input signals for generating countable signals. A counting device 14 is responsive to the countable signals for generating a timed signal for each countable signals and a switching signal after a set number of countable signals. A first timer 16 is responsive to the timed signal for preventing the counting device 14 from responding to the countable signals for a first period of time. A second timer 18 is activated by the first timer 16 at the end of the first period of time for resetting the counting device 14 if a countable signal is not generated during a second period of time.

Referring to FIG. 2, a transducer 30 and an amplifier 32 comprise the main sections of the detection device 12. The transducer 30 may be comprised of any sound-to-electrical energy transducer, such as for example, a condenser microphone. The transducer 30 is actuated by an input signal, such as for example, a telephone ring. The detection device 12 also includes a capacitor 34 which is provided to allow higher frequency sound to pass through and inhibit lower frequency sound. Also, capacitors 36 and 37 are provided to shunt off very high frequencies to ground. Thus, only the desired range of frequencies, such as between 2,000–10,000 cycles per second is allowed to pass into the amplifier 32. The amplifier may be a standard saturation-type amplifier which emits pulses. Further resistors 38 and 40 provide a voltage divider which shapes the pulses as desired. These pulses are herein called countable signals.

As oscillation counter 14 may be of a standard type known in the art, such as for example, a 14-bit binary counter. The countable signal which is generated by the amplifier 32 enters a clock input 52 of the counter. When output 54 goes negative, (as will be further described) a time signal is generated. The output, may be for example, the 10th bit of the counter. As such, it goes negative after 1056 counts of the countable signal. In this way, a minimum duration of the input signal is required in order to generate the time signal. Thus, a stray sound does not trigger the unit.

The time signal, being generated by a positive-to-negative transition, is driven through a capacitor 56. The signal now momentarily becomes a minimum voltage at the trigger 60 of the first stage of a timer 16. The timer itself, may be a dual timer which includes both the first and second timers 16 and 18. An output 62 of the timer 16 becomes positive and places a positive voltage on point 64.

A blocking diode 66 places this positive voltage at the input of the amplifier 32 and prevents any further amplification. In other words, the input signal no longer enters the amplifier because the positive voltage on both sides of capacitor 34 does not allow the input signal to be transmitted through the capacitor. Thus, the countable signals are prevented from entering the counting device 14. The positive voltage at 64 will also be driven through a LED 68 which will light to indicate that an input signal has been recognized and counted.

Resistor 70 and capacitor 72 are connected to the timer 16 and act as a timing selector. After a desired first period of time, such as for example, two seconds, the output 62 becomes negative again and thereby permits an input signal to enter the amplifier 32 and be a countable signal for the counter 14. Then the above-mentioned cycle can begin again. Resistor 70 and capacitor 72 can be chosen to provide any desired time period for the timer 16.

Timer 18 is the other half of the timer 16 and is activated when the timer 16 completes its time period as determined by the timing selectors 70 and 72, as previously mentioned. More specifically, when the output 62 changes from the positive to a negative pulse, i.e., when the timer 16 turns off, then the negative pulse from this transition passes through the capacitor 73 and turns the timer 18 on at input 75 for a second period of time. A positive voltage is then provided on the output 82. However, the inverter 84 changes it to a negative voltage and sets up the condition necessary to reset counter 14 (reset condition is a negative-to-positive transition).

Thus, it can be understood that the end of the first time period of the first timer 16 initiates the second time period of the second timer 18. Also, when the first timer is operating with a positive voltage at output 62, an inverter 74 provides a negative charge through a diode 76. This prevents the timing network of the second timer 18 which includes resistor 78 and capacitor 80 from functioning. The resistor 78 cannot charge capacitor 80 due to the negative charge passing through diole 76.

Now when the second timer is on and the first timer is off, as previously mentioned, a negative signal from output 62 is passed through the inverter 74. The resulting positive voltage is blocked by diode 76, which allows the resistor 78 to charge capacitor 80. Assuming that no further signal is sent to 16 to turn it on, the second period of time is completed and the timer 18 turns off. This results in the timer 18 having a negative output at 82, which is changed to a positive signal through the inverter 84 and thereby resets the counter 14. On the other hand, if another time signal turns on counter 16, before the completion of the second period of time, the negative output of inverter 74 depletes the charge collected and prevents the further charging of capacitor 80. Then the timer 18 can not turn off and reset the counter 14.

When the counter 14 accumulates a desired number of countable signals, i.e. 16, the output 90 goes positive and the transition passes through the capacitor 92 and turns on the SCR 94. A select switch 96 is connected to the SCR 94. The select switch has a first position 98 which is the automatic mode and a second position 100 which is a continuously on mode. When the select switch is in the automatic mode as shown, the pulse through the SCR 94 drives a transistor 102. This causes the signal to pass through line 104 to energize a conventional relay 106, as seen in FIG. 3. The relay closes a switch 108 and thereby causes the power from one side of the power input line 110 to be provided at an outlet 112. A second power line 114 is already connected from the power source 116 to the outlet 112.

A manual switch 118 is provided in the circuit to turn the power on when the system is in the automatic mode (select switch 96 is connected to point 98) and the power is not already provided at the outlet 112. This manual switch is just turned on momentarily to turn on the SCR 94 and thereby connect power to the outlet 112. Then, the automatic timer 130 as will be later described, is activated and turns off the system at a later time. Thus, it is possible to turn on the power at the outlet without requiring the input signal to the detection device 12. In practical terms, the telephone does not have to be rung some desired number of rings to turn on an appliance connected to outlet 112.

Referring to FIG. 2, there is shown a timing network 130. The timing network includes a switch 139 which operates in parallel with switch 96. Switch 139 has a continuously on position 141 and an automatic position 143. When switch 139 is in automatic position 143 and switch 96 is in the corresponding automatic position 98, the timing network operates as follows. The network recycles approximately every 3½ hours. However, when the counter 14 reaches a turn on condition, such as 16 rings, it already passed a turn off condition as will be further described, that resets the timing network. Specifically, capacitor 132 is charged through resistor 134. This resistor determines the time constant with capacitor 132. When capacitor 132 is fully charged, for example in 3½ hours, a unijunction transistor 138 momentarily triggers and causes capacitor 132 to discharge through grounding resistor 133. This discharge causes a momentary zero voltage across SCR 94 and causes it to turn off. The result is transistor 102 opens and causes the relay 106 to open and prevent power from entering outlet 112. Then the timing network 130 is ready to begin the timing sequence again. An additional aspect of switch 143 is that when it is in the continuously on position 141 (while parallel switch 96 is in position 100,) capacitor 132 is held discharged and the timing network is inoperative.

The timing network 130 may also be activated by the manual operation of switch 140 which operates in conjunction with switch 118. In that event, a grounding condition exists and capacitor 132 discharges. When the switch 118 goes back to its off position, capacitor 132 charges up as described above. After the time period determined by resistor 134 has lapsed, it fires unijunction 138 and causes the power to go off at outlet 112.

A third possibility is that after the power is provided to outlet 112, with switch 96 in the automatic position, a series of countable signals which is less than the amount of signals used to turn on the power can be applied to the counter 14. The pins 142 and 144 of counter 14 both go positive. The diodes 146 and 148 both become back-biased and a positive charge can go through a relatively small resistor 150 which immediately fully charges capacitor 132. Then the capacitor discharges through unijunction 138 and turns off the power as previously described.

Another aspect of the operation is that the timing network can be reset in the middle of its cycle. Enough countable signals are sent into the counter 14 to turn the power on such as by ringing a telephone a set number of rings. The number of rings to turn the timing network off is reached first and the power turns off and resets the timing network. Then the number of rings required to turn on the power is reached and the timing circuit is reset to its full operating time.

Referring to FIG. 3, a power supply device is illustrated to change an AC power supply to DC. The AC power, which may be 120 v. passes through a conventional diode 160 which changes AC current to one-half wave DC. Then a capacitor 162 makes the DC more pure. A series of resistors 164 are provided to drop the voltage to the proper desired voltage. Then, the capacitor 166 makes the current more pure. Finally, a zener diode 168 locks the voltage at 12 v. which is suitable for the operation of the device 10.

To better understand the present invention, the typical operation of the system follows. Referring to FIG. 1, there is shown a block diagram of the present invention. A device such as a telephone, not shown, can produce sounds which are input signals to which a detection device 12 is responsive. The detection device includes a sound to electrical transducer 30 and a minimum frequency and volume selector 170 which includes the amplifier 32 as well as capacitors 36 and 37 as seen in FIG. 2. The input signal must be above a minimum volume and exceed a certain duration and be within a desired range of frequencies. The detection device thus generates countable signals corresponding to each input signal which the detection device is able to process. These countable signals, pass through a normally open stop-gate 172 which includes a capacitor 34 and the output of a diode 66. The countable signal then enters a counter 14. The counter responds with a switching signal being sent to a first timer 16. This switching signal activates the timer for a first period of time which may be of any desired time, such as for example, approximately two seconds. In addition, during the first period of time, the timer causes the stop-gate 172 to close and prevent any further countable signals from entering the counter 14.

At the end of the first period of time, the timer 16 goes off. This causes the gate 172 to open and a pulse through line 176 starts the second timer 18. The timer 18 operates for a second period of time which may be approximately five seconds. Note that a telephone usually rings for two seconds and is silent for four seconds. Thus, when a telephone is used to operate the device, another ring occurs before the second timer turns off. If another signal is not detected before the second time period is over, the second timer shuts off and resets the counter to zero.

In the event that another input signal is produced, it enters the counter 14 and the first timer 16 as previously mentioned. This pulse again closes stop-gate 172 and passes through line 176 to disable the second timer 18. If this procedure continues, the counter 14 eventually reaches the desired number of input pulses, such as for example 16 rings from a telephone, and generates a switching signal and causes the power switch 178 to turn on and thereby control any remote controlled device indicated by 180.

Further, at this time, an automatic timing device 182 is activated for any desired period of time such as 3½ hours. At the end of this time, the device 182 opens the power switch 178 and turns off the device 180. Additionally, at any time, a desired number of input signals, i.e., ten telephone rings, which is less than the number of input signals to turn on the device can be applied to the system 10 and cause the device to be shut off by a signal from counter 14. Here again, the device 180 would also be turned off. Also, as mentioned above, the timing device 182 can be reset during its time period to increase the operation time of the device 180.

There has thus been described an apparatus for remote control applications which is easy to operate, not easily activated by an erroneous signal and relatively inexpensive to manufacture.

While there has been described at present what is considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. An apparatus for remote control systems, comprising:
    (a) detection means responsive to input signals for generating countable signals;
    (b) counting means responsive to said countable signals for generating a time signal for each countable signal and a switching signal after a set number of countable signals;
    (c) gate means connected between said detection means and said counting means; and
    (d) first timer means, responsive to said time signal for operating said gate means whereby said counting means is prevented from responding to said countable signals for a first period of time;
    (e) second timer means activated by said first timer at the end of said first period for resetting said counting means if a countable signal is not generated during a second period of time; and
    (f) relay means responsive to said switching signal for controlling a device connected to said apparatus.

2. The apparatus of claim 1 further characterized in that said detection means includes a transducer means for converting a sound input signal to an equivalent electrical signal.

3. The apparatus of claim 2 further characterized in that said detection means further includes selection means for selecting the range of frequency, volume and duration of said electrical signal to form the countable signal.

4. The apparatus of claim 1 wherein said switching signal is utilized for turning said device on after a first set number of countable signals and for turning said device off after a second set number of countable signals.

5. The apparatus of claim 4 wherein the first set number of countable signals is greater than said second set number of countable signals.

6. The apparatus of claim 1 further characterized in that said second timer means is reset in response to a time signal received by said first timer means during said second period of time.

7. The apparatus of claim 6 wherein said first period of time is less than said second period of time.

8. The apparatus of claim 1 wherein said relay includes a power switch means for turning on and controlling said device in response to said switching signal.

9. The apparatus of claim 8 further characterized in that automatic timing means are provided for turning off said power switch means and preventing said device from operating.

* * * * *